United States Patent [19]

Talmadge

[11] Patent Number: 4,853,523

[45] Date of Patent: Aug. 1, 1989

[54] VAULT CARTRIDGE HAVING CAPACITIVE COUPLING

[75] Inventor: Paul C. Talmadge, Ansonia, Conn.

[73] Assignee: Pitney Bowes Inc., Stamford, Conn.

[21] Appl. No.: 104,125

[22] Filed: Oct. 5, 1987

[51] Int. Cl.$^4$ ............................................. G07F 7/10
[52] U.S. Cl. .................................. 235/492; 235/451; 340/870.37; 364/464.02; 364/466
[58] Field of Search ................. 340/870.32; 235/487, 235/492, 451; 364/464.02, 466

[56] References Cited

U.S. PATENT DOCUMENTS

| | | | |
|---|---|---|---|
| 2,894,220 | 7/1959 | Ridgers et al. | 333/24 R |
| 3,098,230 | 7/1963 | Nickerson et al. | 343/703 |
| 3,693,114 | 9/1972 | Kempf | 333/101 |
| 3,771,069 | 11/1973 | Levacher et al. | 233/24 C |
| 3,848,229 | 11/1977 | Perron et al. | 235/382 |
| 3,869,082 | 3/1975 | Ludin | 235/492 |
| 3,935,431 | 1/1976 | Scheffel | 235/492 |
| 3,950,676 | 4/1976 | Dornseifer et al. | 361/40 |
| 4,004,133 | 1/1977 | Hannan et al. | 235/13 |
| 4,339,668 | 7/1982 | Mueller et al. | 307/149 |
| 4,587,410 | 5/1986 | Milnes | 235/382 |
| 4,605,844 | 8/1986 | Haggan | 235/380 |

FOREIGN PATENT DOCUMENTS 0198642 10/1986 .

*Primary Examiner*—A. D. Pellinen
*Assistant Examiner*—Jeffrey A. Gaffin
*Attorney, Agent, or Firm*—Donald P. Walker; Melvin J. Scolnick; David E. Pitchenik

[57] ABSTRACT

A portable data storage module, or vault cartridge, having a data storage device and a plurality of conductive members which are disposed beneath an insulating outer surface of the module. In conjunction with corresponding conductive members in a host device, the corresponding conductive members being disposed adjacent to an outer surface of the module and in registration with the conductive members within the module, the portable data storage module when coupled to the host device is operable for having data capacitively coupled through opposing pairs of conductive members.

17 Claims, 3 Drawing Sheets

VAULT CARTRIDGE HAVING CAPACITIVE COUPLING

FIELD OF THE INVENTION

The present invention relates to a data storage module, or vault cartridge and, in particular, relates to a vault cartridge having a capacitive coupling means for coupling data and other signals into and out of the cartridge.

BACKGROUND OF THE INVENTION

It has been known to use a data storage module, or vault cartridge, in such applications as credit cards and in controllers coupled to a host system. A particular problem associated with the use of such modules is that in order to couple data into and out of the module it is often a requirement that electrical terminals be exposed upon a surface of the module. These terminals may take the form of a card edge connector type terminal or other types of exposed conductive surfaces which are operable for being mated with a suitable connector in a receptacle to which the module is coupled. The terminals may also take the form of optical data transmission and reception devices. The exposure of the terminals may be disadvantageous for several reasons. For example, electrically conductive terminals may, under the influence of atmospheric moisture and contaminants, become oxidized thereby decreasing the conductivity of the terminals. Another disadvantage is that the terminals are exposed to sources of electrical discharge energy, such as static electricity. As is well known, static electricity may cause the degradation or the complete failure of integrated circuit devices which are subjected to a discharge of static electricity. Such integrated circuit devices may typically be included within the data storage module for the storage of data and for performing functions associated with the storage of the data.

Optical-type terminals may also be susceptible to conducting static electrical discharges into the storage module. Also, the radiation transmission and reception means, such as a lens, must be maintained free of radiation absorbing contaminates such as dirt and grease.

Due to this requirement of previous data storage modules that the data coupling terminals be in physical contact or otherwise physically accessible to the host system mating terminals, the exposure of the terminals upon a surface of the data storage module can result in the overall degradation of the operation of the module or even in the complete failure of the module to reliably store data. This problem is especially acute in relatively small and portable data storage modules which by definition may be inserted and removed a number of times from a host system. Such modules may also be especially vulnerable in that they are typically carried about in a jacket or shirt pocket where the danger of exposure to static electric discharge is increased.

It is therefore one objective of the invention to provide a vault cartridge which does not have data signal coupling conductors exposed upon a surface of the cartridge.

It is also an objective of the invention to provide a vault cartridge which has data signal coupling means enclosed within a nonconductive protective covering of the cartridge.

It is a still further objective of the invention to provide a vault cartridge having conductive plate-like members disposed beneath an insulating covering of the cartridge, the plate-like members forming, in conjunction with plate-like members in a vault receptacle, a plurality of capacitors for capacitively coupling data and other signals into and out of the cartridge.

SUMMARY OF THE INVENTION

The foregoing problems are overcome and other advantages are realized by a system for storing data within a data storage device comprising means for storing data; means for enclosing the data storing means, the enclosing means having walls comprised of a material which is substantially electrically nonconductive and which has a dielectric constant associated therewith; a first plurality of conductive plate means disposed within the enclosing means and substantially adjacent to an inner surface of at least one of the walls; a plurality of data receiving means individual ones of which are coupled to individual ones of the first plurality of plate means, each of the data receiving means having an output operatively coupled to the data storing means; a second plurality of conductive plate means being disposed substantially adjacent to an outer surface of at least one of the walls, individual ones of the second plurality of plate means further being disposed substantially in registration with individual ones of the first plurality of plate means such that corresponding ones of the first and the second plate means are operable for defining an electrical capacitor; and a plurality of data transmission means individual ones of which are coupled to individual ones of the second plate means such that the data transmission means are operable for capacitively coupling data for storage within the data storing means through corresponding ones of the first and second plate means.

BRIEF DESCRIPTION OF THE DRAWINGS

The foregoing aspects and other features of the invention will become more apparent in the following detailed description of the invention taken in conjunction with the accompanying drawings wherein.

DETAILED DESCRIPTION OF THE INVENTION

Figure 1:
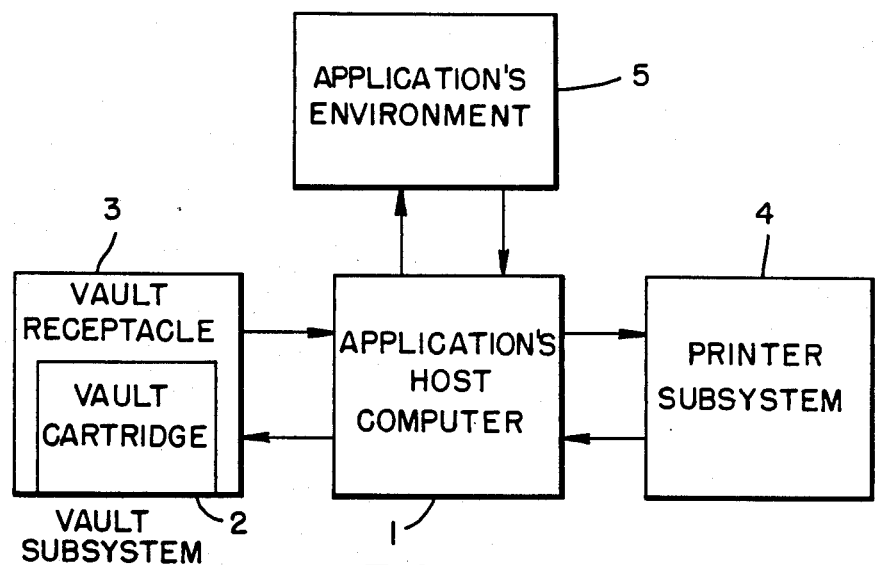
FIG. 1 is a block diagram showing a portable data storage module, or vault cartridge, coupled to an application host computer through a vault receptacle.

Referring now to FIG. 1 there is shown in block diagram form a system having an application's host computer 1 bidirectionally coupled to a vault subsystem which comprises a vault cartridge 2 coupled to a vault receptacle 3. Application's host computer 1 is also bidirectionally coupled to a printer subsystem 4 and is further bidirectionally coupled to an application's environment 5. In general, host computer 1 may be any data processing means operable for executing an application program, such as a computer operable for executing a postage dispensing application program. The application's environment 5 may include a user of the host computer or may also be another computing system which is coupled to the application's host computer and is operable for transmitting data to and receiving data from the application's host computer 1. The block designated as 5 may comprise a familiar CRT screen and a keyboard which are both operable for providing an operator with a means for interacting with the application's host computer 1. Vault cartridge 2 may comprise a data storage means operable for storing data generated by the application's host computer 1. The vault cartridge 2 may also comprise, for example, ascending and descending postage registers which are maintained within the cartridge 2 in a secure environment. The vault receptacle 3 may be an electromechanical mechanism having electronic and electrical power coupling means for coupling data into and out of the vault cartridge 2 and also for providing operating power thereto. In accordance with the invention, the vault cartridge 2 may be detachably coupled to the vault receptacle enabling the cartridge to be removed and inserted as desired by a user or some operator of the system. Printer subsystem 4 may be any suitable printing means which is operable for receiving data from the application's host computer for printing. The printer subsystem 4 may be a printer operable for printing a postage indicia which is representative of a monetary value of postage. Printer subsystem 4 may be a secure printer system which is bidirectionally coupled to the application host computer 1 for receiving therefrom and transmitting thereto security codes such as cryptographic codes which enable the printer subsystem 4 to print. Although shown as a plurality of separate blocks, it should be realized that the application's host computer 1, the vault cartridge 2, the vault receptacle 3 and the printer subsystem 4 may all be contained within a single system. That is, these blocks may not be independent systems but the functions thereof may all be incorporated within one system. Similarly, different combinations of the blocks are possible such that the application's host computer 1 and the vault receptacle may comprise one system having a printer subsystem coupled thereto through a suitable cable or some other data transmission means.

As an example of the operation of such a system, the application's host computer 1 may receive a request from the application's environment 5, such as a request from a user to print a postage indicia representative of a monetary value of postage. In response thereto, the application's host computer 1 may interrogate the vault cartridge 2 within vault receptacle 3 to determine if the descending register securely contained therein indicates a sufficient value of postage funds to print the desired value of postage. Upon receiving an indication from the vault cartridge 2 that such funds are available the application's host computer may thereafter send data to the printer subsystem 4 which causes the printer subsystem 4 to print the postage indicia indicating the desired monetary value. Of course, such a system as depicted in FIG. 1 may be adapted to a wide number of applications such as the printing of lottery tickets or the printing of tax stamps, such as the stamps affixed to liquor and cigarettes.

Figure 2:
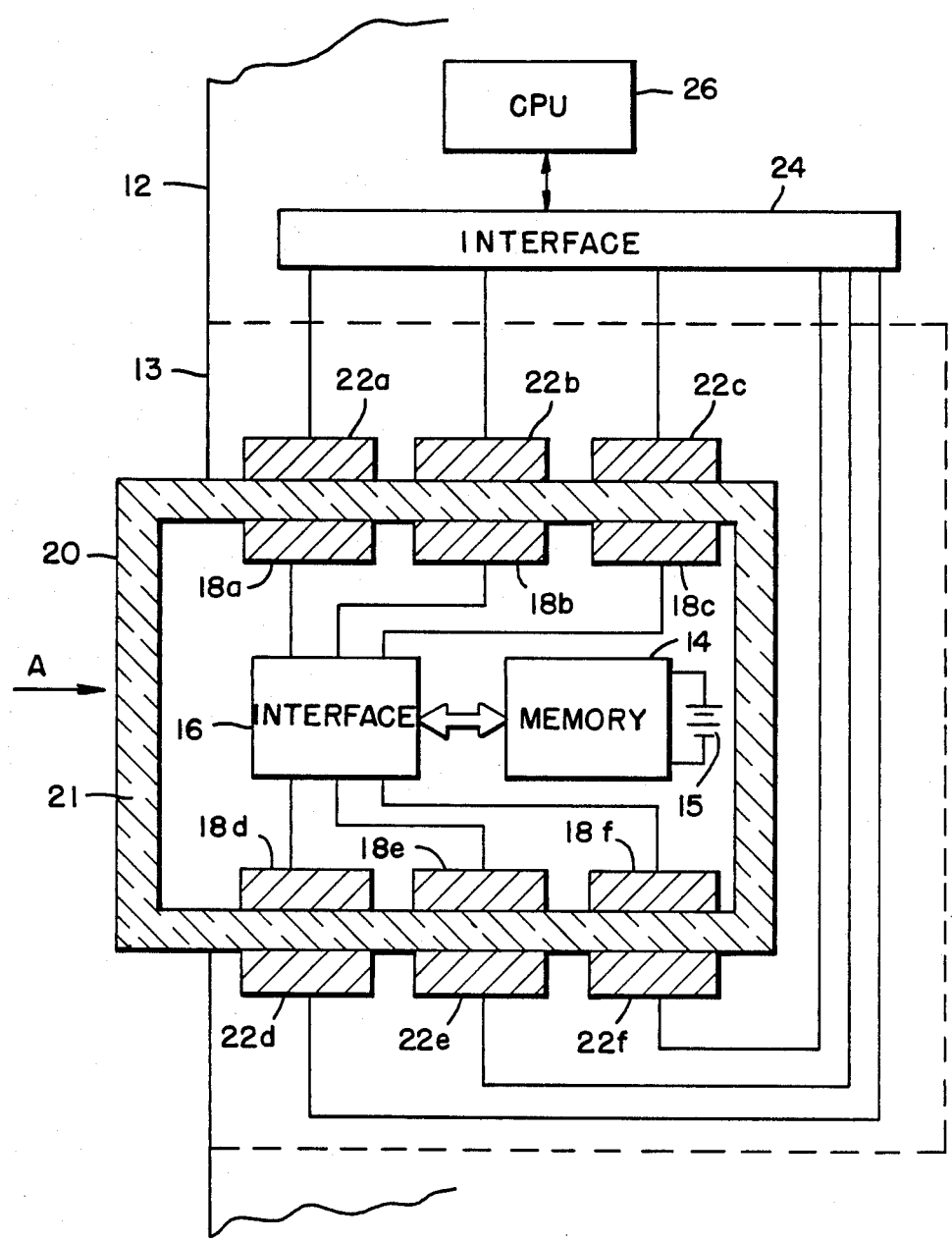
FIG. 2 is a cutaway view, in block diagram form, of a vault cartridge coupled to an application host computer.

Referring now to FIG. 2 there is shown in block diagram form a portable data storage module device, or vault cartridge 10, coupled to an application's host computer, or host device, 12. Vault 10 is comprised of a data storage means such as a random access memory (RAM) 14 which is operable for the read/write storage of data within. RAM 14 may be a nonvolatile data storage device. For example, RAM 14 may have a battery 15 coupled thereto for maintaining the data stored within the RAM 14 when the vault 10 is uncoupled from the host 12. Vault 10 may also comprise memory interface 16 which is operable for providing address, data and control lines to the RAM 14 for storing and retrieving data therefrom. Interface 16 may also comprise data transmission and reception circuitry. Of course, interface 16 may also comprise a data processing means such as a microcomputer device having program and data storage and which is operable for at least storing and retrieving data within RAM 14.

In accordance with the invention, vault 10 also comprises a plurality of conductive members such as plates 18a through 18f, the plates 18 being conductively coupled to interface 16. As can be seen, the plates 18 are disposed beneath an outer surface 20 of the vault 10. The surface 20 can be seen to be the outer surface of a module casing or enclosure 21 which may be comprised of an insulating thermoplastic material. The enclosure 21 serves to both protect the components within the vault 10 and also serves as a capacitor dielectric material, as will be discussed hereinafter.

Host 12 can be seen to comprise a vault receptacle 13 which may be physically separate from the host 12 or integrally joined thereto. Receptacle 13 comprises a plurality of conductive members such as plates 22a through 22f which are disposed such that these plates 22 are in registration with corresponding plates 18a through 18f when vault 10 is fully inserted within the receptacle 13. Plates 22 may be placed in physical contact with the outer surface 20 of enclosure 21 by the operation of the vault receptacle 13, the receptacle being operated to insert, retain and withdraw the vault 10. The vault 10 may be inserted in the direction indicated by the arrow A. Plates 22 are coupled to a host interface 24 which in turn may be coupled to a host data controlling device, such as a central processing unit (CPU) 26. Host interface 24 may comprise data transmission and reception circuitry. It should be appreciated that host 12 may be the applications's host computer 1 of FIG. 1.

As is apparent in FIG. 2, when the vault 10 is fully inserted within the receptacle 13 adjacently disposed plates, such as the plates 18a and 22a, form the opposing plates of an electrical capacitor. The material of enclosure 21 between these plates serves as a capacitor dielectric material. In accordance with the invention, each of these capacitors so formed, in conjunction with interfaces 16 and 24, is operable for the transmission and reception of data and other signals therethrough.

Although six such capacitors are shown in FIG. 2, it should be realized that more or less than six capacitors may be employed for a given application. As an example, eight such capacitors may be provided for coupling a byte comprised of eight bits of data, another eight capacitors may be provided for coupling eight memory address lines and one or more capacitors may be provided for coupling a memory control line such as a read or a write control line or for coupling a synchronization signal such as a constant frequency clock signal. For example, with 17 such lines provided it is possible for the host 12 to store and retrieve up to 256 eight bit bytes of data from the memory 14.

Figure 3:
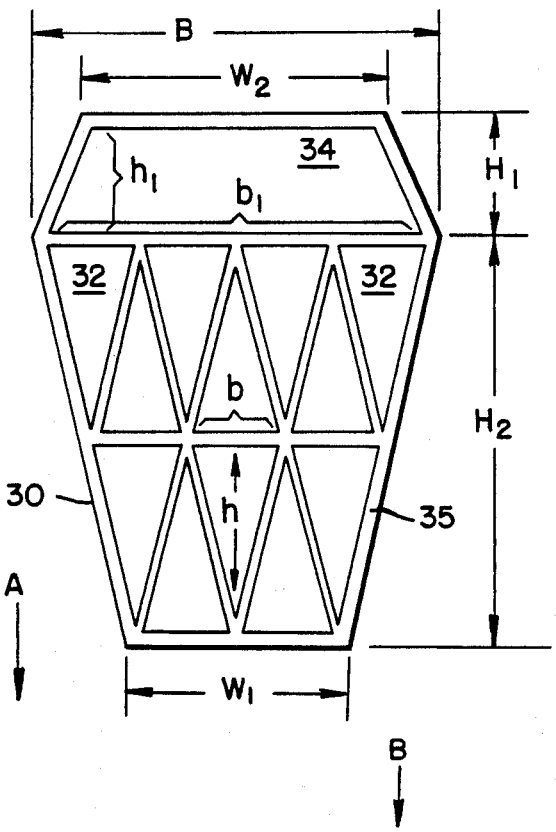
FIG. 3 is a top view showing conductive plate members disposed beneath one surface of a vault cartridge.

Referring now to FIG. 3 there is shown a top view of one embodiment of a vault cartridge 30 having a plurality of conductive plates 32 disposed beneath a top surface thereof. In FIG. 3 the top surface of the cartridge 30 has been cut away to show the plates.

Figure 3A:
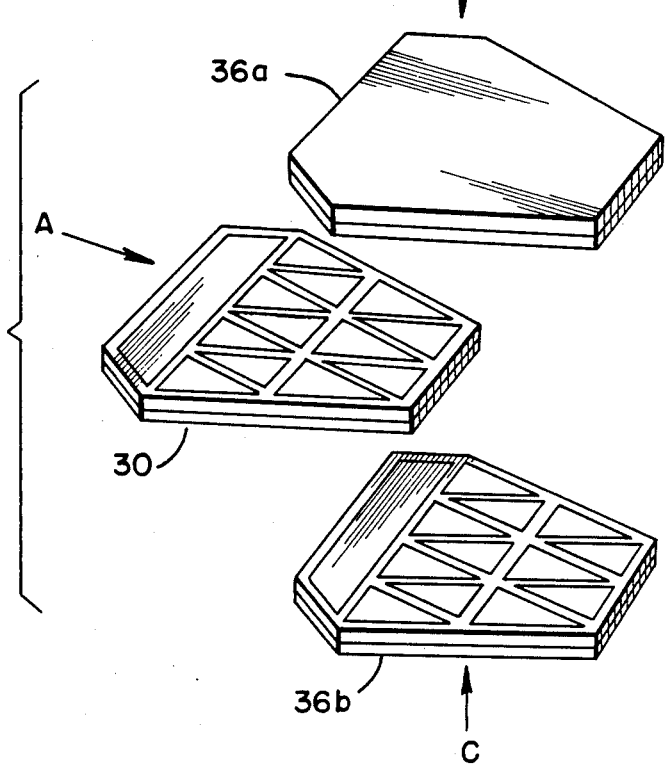
FIG. 3a is an elevational view showing the vault cartridge of FIG. 3 and a pair of opposed cartridge engaging members.

It can be seen in FIG. 3 that cartridge 30 may have a planar asymmetrical shape which resembles two trapezoids each having a common, equal base (B) and unequal heights ($H_1$ and $H_2$) measured from the base. Such a shape results in the cartridge 30 having inwardly tapered side surfaces which may have an angle of approximately 15° as measured from the common base. When installed within a suitable receptacle the cartridge top and bottom surfaces, as shown in FIG. 3a, may be firmly engaged between an opposing pair of engaging members 36a and 36b each of the engaging members 36 having corresponding plates whereby the individual signal and ground coupling capacitors are formed. In operation, the insertion of cartridge 30 into receptacle 13 causes the movement of members 36a and 36b as depicted by arrows B and C. When fully inserted, cartridge 30 is securely interposed between members 36, the top and bottom surface plates of cartridge 30 being aligned with the corresponding plates of members 36.

As can be seen, the plates 32 may have an essentially triangular shape such that the utilization of the surface area of cartridge 30 is optimized. In accordance with the invention, each of the plates 32 is coupled within the cartridge 30 to a suitable data transmission and reception circuit. Also provided on the surface of cartridge 30 may be an essentially trapezoidal plate 34 which is operable for providing a ground reference with a host system. Due to the asymmetrical shape of cartridge 30, the cartridge may be installed within a corresponding receptacle in only one given manner, such as in the direction of the arrow A, thereby facilitating the alignment and registration of each of the plates 32 and 34 with a corresponding plate of similar shape within the receptacle. The plate configuration as shown in FIG. 3, it should be realized, may be duplicated upon a bottom surface of the cartridge 30. Thus, a total of 24 capacitive plates may be provided for the coupling of digital signals while two plates are provided for the coupling of the ground reference. It should be further realized that each of the plates 32 and 34 is preferably disposed beneath the insulating surface (not shown) of cartridge 30, the enclosure material serving as a capacitive dielectric. The individual plates may be fabricated by a number of well known methods, such as by forming all of the plates 32 and 34 upon a surface of a common nonconducting substrate 35 by well known printed circuit fabrication techniques.

In a preferred embodiment, the approximate dimensions (in inches) shown in FIG. 3 are as follows:
B=3.5
$H_1$=1.0
$H_2$=3.5
$W_1$=2.0
$W_2$=2.75
b=0.75
h=1.5
$b_1$=3.75
$h_1$=0.9

Of course, the overall shape of device 30 of FIG. 3 and the shape, dimensions, number and placement of the plates 32 and 34 is illustrative only, it being realized that the particular shape, dimensions, number and placement of the plates is a matter which may be application dependent.

Figure 4:
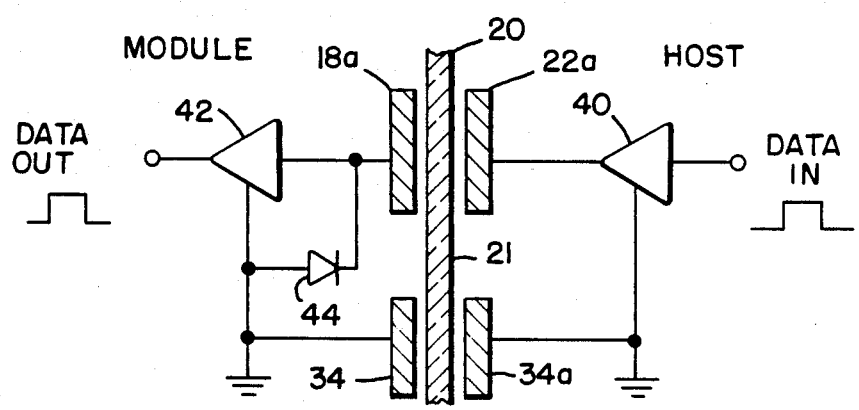
FIG. 4 is a simplified schematic diagram showing circuitry operable for unidirectional capacitively coupled transmission and reception of digital signals.

Referring now to FIG. 4 there is shown one embodiment of interface circuitry which is operable for coupling a signal through a pair of opposing plates, such as the plates 18a and 22a of FIG. 2. As can be seen, the plate 22a is coupled to the output of a driver device 40 within the host 12. The input to driver device 40 may be a data line or an address line the state of which is typically controlled by CPU 26. The opposing plates 18a and 22a form a capacitor having a dielectric material interposed between the plates, the dielectric comprising an interposed portion of the enclosure 21 of the vault 10. As can be seen, each of the devices 40 and 42 may have a ground reference coupled therebetween by a capacitor formed by the plate 34 of FIG. 3 and a corresponding plate 34a in the vault receptacle. A diode 44 may be provided at the input to device 42 for clamping the transmitted data signal to the ground reference. Of course, the diode may be integrally formed within the semiconductor device 42, it being well known that such semiconductor devices often have diodes, such as Schottky diodes, provided at their inputs.

In operation, device 40 will provide an electrical potential upon the plate 22a. This electrical potential will be coupled through the dielectric material of the enclosure 21 resulting in the transfer of charge to plate 18a. This charge is detected by device 42 and is expressed in the output of device 42. Thus, it can be seen that if device 40 impresses a time varying electrical potential upon plate 22a that the output of device 42 will be expressive of the time varying input signal to device 40. This capacitive coupling technique of the invention is well suited for coupling digital data at high speed through the opposing plates 18a and 22a.

Figure 5:
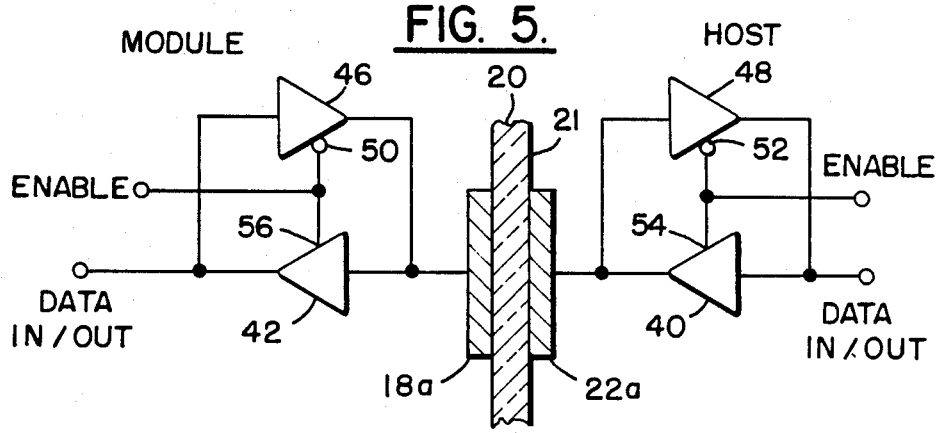
FIG. 5 is a simplified schematic diagram showing circuitry operable for bidirectional capacitively coupled transmission and reception of digital signals.

Referring to FIG. 5 there is shown circuitry operable for the bidirectional communication of data through a single pair of plates such as the plates 18a and 22a. As can be seen, each of the plates is provided with an opposing pair of data drivers and receivers in addition to the driver 40 and receiver 42 of FIG. 4. These additional drivers and receivers 46 and 48, respectively, may each be provided with an active low enabling input 50 and 52, respectively, while driver 40 and receiver 42 are each provided with an active high enabling input 54 and 56, respectively. Thus, it can be seen that when an ENABLE signal is at a logic high that the lower driver/receiver 40 and 42 is operable for transmitting a bit of data from the right to the left as shown in FIG. 5 while the upper pair 46 and 48 is disabled. When the ENABLE signal is at a logic low level, the upper driver/receiver pair 46 and 48 is operable for transmitting a bit of data from the left to the right of FIG. 5, while the lower pair 40 and 42 is disabled.

Of course, a number of different types of suitable data drivers and receivers may be utilized for transmitting and receiving bits of information through a respective pair of capacitive plates, it being realized that the devices shown in FIGS. 4 and 5 are illustrative only.

It has been found that if each conductive plate of a pair of plates, such as the triangular plates 32 of FIG. 3, have a surface area of approximately 0.7 inches and that if the plates are separated by an enclosure wall having a thickness of approximately 0.02 inch, the enclosure wall material having an intrinsic dielectric constant of approximately 4.0 to 4.9, that the capacitance value associated with a pair of such plates will be in a range of approximately 12 to 35 picofarads at a frequency of approximately one MHz. This value of capacitance is within the range of capacitance which may be driven by an integrated circuit data transmission device at a high data transmission rate.

As has been stated, the use of the invention may prove advantageous in a number of different types of systems. One such system is a value printing system such as a system operable for the printing of postage, or a system operable for printing tax stamps or tickets for entertainment events.

In a postage printing system, for example, it is a requirement that the value of postage printed or otherwise dispensed be accurately accounted for. This postage accounting data is typically maintained in ascending and descending registers, the registers typically being stored within a non-volatile data storage device. In order to recharge the postage meter with funds the descending register has stored within a value expressive of the funds. This recharging is typically accomplished at a postal facility by physically removing the entire postage meter to the facility.

As can be appreciated, the use of the invention permits a data storage module, such as the vault cartridge 30 of FIG. 3, to be removed from the host system 12, which host system may include a postage indicia printing means. The cartridge 30 may thereafter be conveyed to a recharging facility, perhaps by mailing the cartridge, where the cartridge 30 is recharged with postal funds. That is, data representing postal funds is stored within the memory of the cartridge 30. The recharged cartridge may thereafter be inserted into the vault cartridge receptacle to resume the printing of postage. Due to the capacitive data coupling apparatus and method of the invention, the cartridge terminals are not exposed at any time to possibly damaging, environmental factors, thereby assuring the security and integrity of the valuable postage accounting data stored within.

It should be realized that illustrative embodiments only of the present invention have been provided above and that a number of modifications to the illustrative embodiments may become apparent to those skilled in the art. Therefore, the embodiments disclosed herein are not meant to limit the invention, instead the invention is meant to be limited only as defined by the appended claims.

What is claimed is:

1. A system for storing data within a data storage device comprising:
    means for storing data;
    means for enclosing said data storing means, said enclosing means having walls comprised of a material which is substantially electrically nonconductive and which has a dielectric constant associated therewith;
    a first plurality of conductive plate means disposed within said enclosing means and substantially adjacent to an inner surface of at least one of said walls;
    a plurality of electronic data receiving means, individual ones of which are coupled to individual ones of said first plurality of plate means, each of said data receiving means having an output operatively coupled to said data storing means;
    a second plurality of conductive plate means being disposed substantially adjacent to an outer surface of at least one of said walls, individual ones of said second plurality of plate means further being disposed substantially in opposing relationship with individual ones of said first plurality of plate means such that corresponding ones of said first and said second plate means are operable for defining an electrical capacitor; and
    a plurality of electronic data transmission means, individual ones of which are coupled to individual ones of said second plate means for capacitively coupling data for storage within said data storing means through corresponding ones of said first and second plate means.

2. A system as defined in claim 1 wherein said walls have a thickness of approximately 0.02 inch and wherein said dielectric constant is approximately 4.0 to 4.9.

3. A system as defined in claim 2 wherein each of said capacitors defined by corresponding ones of said first and said second plate means have a value of capacitance of approximately 12 to 35 picofarads.

4. A system as defined in claim 1 wherein at least one of said capacitors defined by said first and said second plate means is a ground reference capacitor, said ground reference capacitor being coupled at said first plate means to a first circuit ground potential internal to said data storage device and at said second plate means to a second circuit ground potential external to said data storage device.

5. A system as defined in claim 1 wherein said data storage device has an upper and a lower wall disposed in a parallel spaced apart fashion one from the other and wherein said first plurality of plate means are disposed adjacent to an inner surface of said upper wall.

6. A system as defined in claim 5 further comprising a third plurality of plate means, individual ones of which are disposed substantially adjacent to an inner surface of said lower wall, said system further comprising a fourth plurality of plate means individual ones of which are disposed substantially adjacent to an outer surface of said lower wall, individual ones of said third plurality of plate means further being disposed in opposing relationship with corresponding ones of said fourth plurality of plate means.

7. A system as defined in claim 1 wherein certain ones of said first and said second plate means are provided with bidirectional electronic data transmission and reception means operable for communicating data into and out of said data storage device.

8. A system as defined in claim 1 wherein said second plurality of plate means are provided within a receptacle means and wherein said data storage device is detachably coupled to said receptacle means.

9. A system as defined in claim 6 wherein said upper and said lower walls each have a shape defined by two trapezoids having a common base and unequal heights and wherein said base is approximately 3.5 inches in length and wherein one of said heights is approximately 1.0 inch and wherein the other one of said heights is approximately 3.5 inches.

10. A system as defined in claim 9 wherein said plurality of plate means comprises 12 conductive plates each being triangular in shape having a base approximately 0.75 inches in length and a height of approximately 1.5 inches.

11. A system as defined in claim 4 wherein said ground reference capacitor has a trapezoidal shape having a base approximately 3.75 inches in length and a height of approximately 0.9 inches.

12. A vault cartridge for storing accounting data in a value printing system comprising:
   an integrated circuit data storage device operable for storing digital data expressive of accounting data related to the printing of items having a monetary value;
   an enclosure for enclosing said data storage device within; and
   a first plurality of conductive plate-shaped members coplanarly disposed along at least one inner surface of said enclosure, each of said first plurality of members being operatively coupled to said data storage device, each of said first plurality of members further being disposed in opposing relationship with a second plurality of plate-shaped members coplanarly disposed along an outer surface of said enclosure such that opposing pairs of plate-shaped members each define a capacitor operable for coupling the accounting data into said data storage module for storage within said data storage device.

13. A vault cartridge as defined in claim 12 wherein said data storage device is a nonvolatile data storage device.

14. A vault cartridge as defined in claim 13 wherein said value printing system is comprised of a postage meter and wherein the accounting data is related to the printing of postage indicia having a monetary value.

15. A vault cartridge as defined in claim 14 wherein said enclosure is detachably coupled to said second plurality of plate-like members such that said cartridge may be removed from said value printing system.

16. A method of storing data within and retrieving stored data from a data storage device, the device being disposed within a protective module, comprising the steps of:
   contacting a first plurality of electrically conductive plate-shaped members upon at least one outer surface of the module, individual ones of the first plate-shaped members being operatively coupled to a first data transmission and reception means;
   providing a data storage device within the module;
   providing a second plurality of electrically conductive plate-shaped members upon an inner surface of the module, individual ones of the second members being provided in opposing relationship with individual ones of the first plurality of members, individual ones of the second plurality of members further being operatively coupled to a second data transmission and reception means;
   operatively coupling the second data transmission and reception means to the data storage device for providing data inputs and outputs and data storage and retrieval control commands to and from the device; and
   capacitively coupling data to be stored from the first data transmission and reception means through opposed pairs of the first and second members and into the storage device through the second data transmission and reception means.

17. A method as claimed in claim 16 further comprising a step of:
   capacitively coupling stored data to be retrieved from the storage device through the second data transmission and reception means and through the opposed pairs of the first and second members to the first data transmission and reception means.

* * * * *